(12) United States Patent  
Harpur et al.

(10) Patent No.: US 10,250,851 B1  
(45) Date of Patent: Apr. 2, 2019

(54) VIDEO FEEDS IN COLLABORATION ENVIRONMENTS

(71) Applicant: International Business Machines Corporation, Armonk, NY (US)

(72) Inventors: Liam S. Harpur, Skerries (IE); Mark Delaney, Raleigh, NC (US); Robert H. Grant, Atlanta, GA (US); Trudy L. Hewitt, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/814,685

(22) Filed: Nov. 16, 2017

(51) Int. Cl.  
*H04N 7/14* (2006.01)  
*H04N 7/15* (2006.01)  
*G10L 25/63* (2013.01)

(52) U.S. Cl.  
CPC ............. *H04N 7/152* (2013.01); *G10L 25/63* (2013.01); *H04N 7/147* (2013.01)

(58) Field of Classification Search  
CPC .......... H04N 7/147; H04N 7/15; H04N 7/142; H04N 7/152; H04N 7/157; H04N 21/4223; H04N 7/148; H04N 7/155  
USPC ................................. 348/14.01, 14.08, 14.09  
See application file for complete search history.

(56) References Cited

U.S. PATENT DOCUMENTS

| | | | | |
|---|---|---|---|---|
| 8,098,273 B2* | 1/2012 | Khouri | ............... | G06K 9/00315 348/14.1 |
| 8,210,848 B1* | 7/2012 | Beck | ................. | H04M 1/72594 382/307 |
| 9,071,728 B2 | 6/2015 | Begeja et al. | | |
| 9,685,193 B2 | 6/2017 | Cunico et al. | | |
| 2010/0223581 A1* | 9/2010 | Manolescu | ............ | G06Q 10/00 715/853 |

(Continued)

FOREIGN PATENT DOCUMENTS

KR          101745602          6/2017

OTHER PUBLICATIONS

Disclosed Anonymously, "Enhanced Meeting (Conference Call) Experience Using Measured Sensory Characteristics of Participants," IPCOM000207674D, 2011.

(Continued)

*Primary Examiner* — Quoc D Tran  
(74) *Attorney, Agent, or Firm* — Maeve Carpenter; George S. Blasiak; Heslin Rothenberg Farley & Mesiti PC

(57) ABSTRACT

Methods, computer program products, and systems are presented. The method computer program products, and systems can include, for instance: obtaining respective video feeds of respective participants of a group of video conference participants, wherein the group of video conference participants includes one or more presenter participant and one or more viewer participant; examining data of the respective video feeds to determine a current group aggregate sentiment output for the video conference, wherein the examining includes subjecting data of feeds of the respective video feeds to sentiment analysis that includes processing of facial feature representing video data of the feeds; and presenting a video conference view to one or more participant of the group of video conference participants based on the group aggregate sentiment output.

20 Claims, 11 Drawing Sheets

(56) References Cited

U.S. PATENT DOCUMENTS

| | | | |
|---|---|---|---|
| 2011/0276369 A1* | 11/2011 | Bean | G06Q 10/00 |
| | | | 705/7.42 |
| 2014/0229866 A1* | 8/2014 | Gottlieb | H04L 65/403 |
| | | | 715/758 |
| 2014/0253672 A1* | 9/2014 | Bank | H04L 65/403 |
| | | | 348/14.08 |
| 2015/0193718 A1 | 7/2015 | Shaburov et al. | |
| 2017/0154211 A1 | 6/2017 | Shaburov et al. | |

OTHER PUBLICATIONS

Unknown, "Emotient Facial Expression Analysis Engine," http://imotions.com/emotient/, 2017.

Barsade, S.G., "The Ripple Effect: Emotion Contagion and its Influence on Group Behavior," Administrative Science Quarterly, Sage Publications, Inc., vol. 437—No. 4, pp. 644-675 (Dec. 2002).

\* cited by examiner

US 10,250,851 B1

VIDEO FEEDS IN COLLABORATION ENVIRONMENTS

BACKGROUND

Online conferencing systems are widely used to provide collaborative sessions between two or more participants, by allowing the participants to exchange video- and/or audio-content, voice and instant messages, etc. An online conferencing system can be integrated with a variety of collaboration applications, including, for example, media sharing applications, instant messaging applications, video- and audio-streaming applications, and telephony applications.

SUMMARY

Shortcomings of the prior art are overcome, and additional advantages are provided, through the provision, in one aspect, of a method. The method can include, for example: obtaining respective video feeds of respective participants of a group of video conference participants, wherein the group of video conference participants includes one or more presenter participant and one or more viewer participant; examining data of the respective video feeds to determine a current group aggregate sentiment output for the video conference, wherein the examining includes subjecting data of feeds of the respective video feeds to sentiment analysis that includes processing of facial feature representing video data of the feeds; and presenting a video conference view to one or more participant of the group of video conference participants based on the group aggregate sentiment output.

In another aspect, a computer program product can be provided. The computer program product can include a computer readable storage medium readable by one or more processing circuit and storing instructions for execution by one or more processor for performing a method. The method can include, for example: obtaining respective video feeds of respective participants of a group of video conference participants, wherein the group of video conference participants includes one or more presenter participant and one or more viewer participant; examining data of the respective video feeds to determine a current group aggregate sentiment output for the video conference, wherein the examining includes subjecting data of feeds of the respective video feeds to sentiment analysis that includes processing of facial feature representing video data of the feeds; and presenting a video conference view to one or more participant of the group of video conference participants based on the group aggregate sentiment output.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining respective video feeds of respective participants of a group of video conference participants, wherein the group of video conference participants includes one or more presenter participant and one or more viewer participant; examining data of the respective video feeds to determine a current group aggregate sentiment output for the video conference, wherein the examining includes subjecting data of feeds of the respective video feeds to sentiment analysis that includes processing of facial feature representing video data of the feeds; and presenting a video conference view to one or more participant of the group of video conference participants based on the group aggregate sentiment output.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
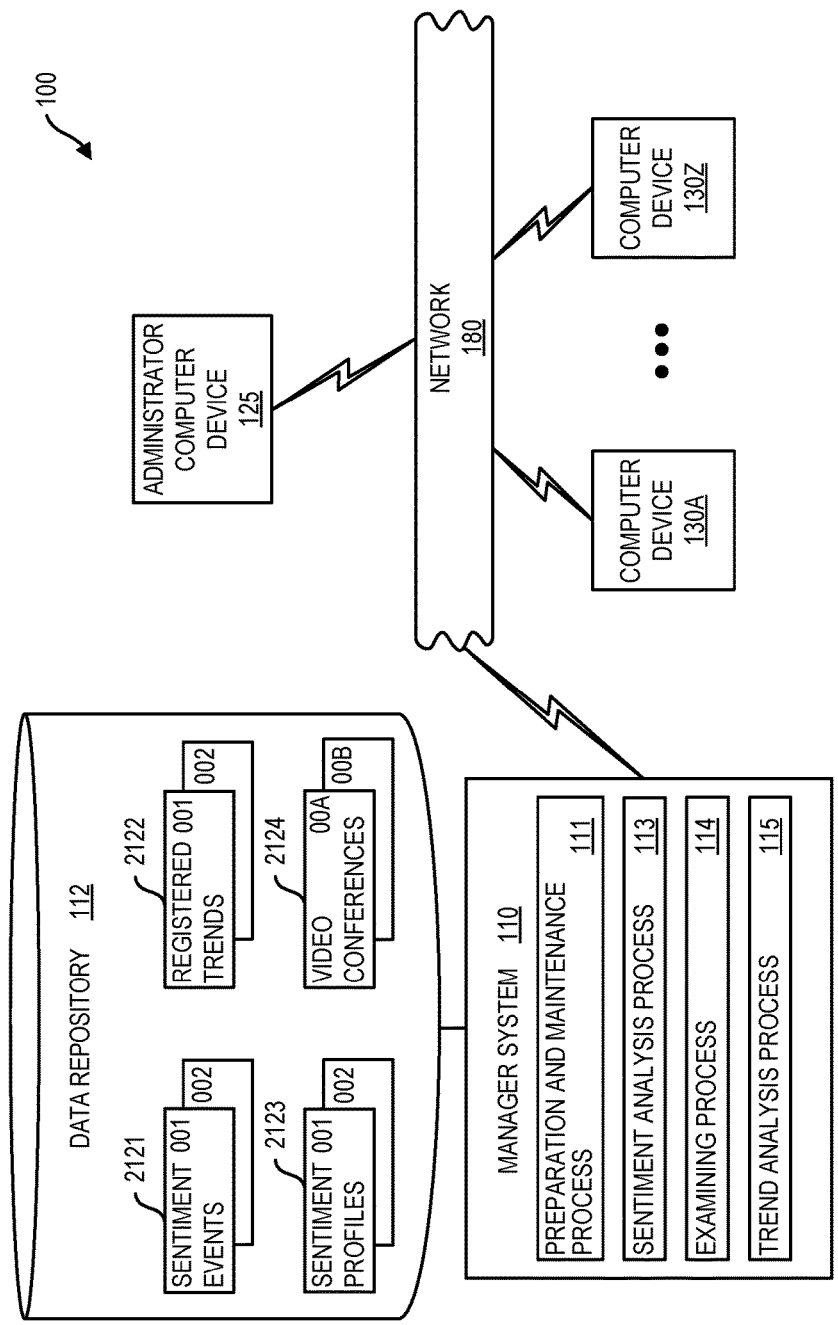
FIG. 1 is a schematic view of a system having a manager system, an administrator computer device, and computer devices according to one embodiment.

FIG. 1 is a block diagram of system 100, in accordance with one embodiment as set forth herein. In the embodiment of FIG. 1, system 100 can include numerous devices such as computing node based devices connected by a network 180. Network 180 can be provided, e.g. a physical network and/or a virtual network. A physical network can be for example, a physical telecommunications network connecting numerous computing nodes or systems, such as computer servers and computer clients. By contrast, a virtual network can for example, combine numerous physical networks or parts thereof into a logical virtual network. In another example, numerous virtual networks can be defined over a single virtual network.

By way of explanation, FIG. 1 depicts an example environment. In one embodiment, system 100 can include a manager system 110, having an associated data repository 112, administrator computer device 125, computer devices 130A-130Z, connected via network 180. Computer devices 130A-130Z, can be computer devices used by users of system 100. Users of system 100 can be for example, participants of a video conference as set forth herein. Computer devices 130A-130Z can be client computers for use by users of system 100 who may be video conference participants. Computer devices 130A-130Z can be provided e.g., by smartphones, laptops, smartwatches, and/or PCs. Administrator computer device 125 can be a computer device that is used by an administrator user of system 100 and of manager system 110. Administrator computer device 125 can be a client computer device for use by an administrator user and can be provided e.g. by a smartphone, laptop, smartwatch, and/or PC.

Manager system 110 can run various processes such as preparation and maintenance process 111, sentiment analysis process 113, examining process 114, and trend analysis process 115. In one embodiment system 100 can be configured to support video conferencing communications between computer devices of computer devices 130A-130Z. For providing video conferencing communications, in one embodiment, system 100 can be configured to operate in accordance with the Real-time Transport Protocol (RTP), which is set forth in Requests for Comments (RFC) 3550, published by the Internet Engineering Taskforce (IETF) and the Internet Society (ISOC).

Referring to further aspects of manager system 110, manager system 110 can include in data repository 112, sentiment events area 2121 for storing data relating to sentiment events experienced by users of system 100 during video conference participants, registered trends area 2122 for storing data on trends relating to users of system 100 that have been recognized by system 100, sentiment profile area 2123 for storing data that can be examined for determining sentiment characteristics of users and video conference area 2124 for storing data on video conferences which are being supported or which have been supported by system 100.

Manager system 110 can run preparation and maintenance process 111 to prepare and maintain data for storage into data repository 112 for use by other processes such as examining process 114 and trend analysis process 115. Manager system 110 can run preparation and maintenance process 111 for storage of data into data repository 112. In some instances, manager system 110 can run preparation and maintenance process 111 to perform processing of data such as live video feed data of a video conference and to store such data into data repository 112. In some instances, manager system 110 can run preparation and maintenance process 111 to perform processing of data obtained from sensors of computer devices 130A-130Z for storage into data repository 112 for processing for determining of sentiments of user of system 100. Sensors providing output for processing by preparation and maintenance process 111 can include e.g., sensors for location, e.g. GPS sensors, camera sensors, gyroscopes, temperature sensors, humidity sensors, heartrate sensors, blood pressure (bp) sensors, audio sensors and the like. On receipt of sensor output data, manager system 110 running preparation and maintenance process 111, in some instances, can activate sentiment analysis process 113 to process the receive data.

Manager system 110 can run sentiment analysis process 113 to determine sentiment parameters associated with content e.g. video content, audio content, text based content. In one specific example, manager system 110 running sentiment analysis process 113 can process video conference video data representing facial features and based on the processing of the video data can determine a sentiment associated with the person represented in the video data. Manager system 110 running sentiment analysis process 113 can include manager system 110 processing of facial feature representing video data for sentiment classification. Determined sentiment parameters can include e.g. a polar sentiment parameters, "negative," "positive," and/or non-polar sentiment parameters, e.g. "anger," "disgust," "fear "sadness" and/or "joy." In one embodiment sentiment analysis process 113 for providing sentiment classification based on processing of facial feature representing video data can run EMOTION VIDEO ANALYTICS™ software by nVISO™ of Lausanne, Switzerland available on IBM SmartCloud™ services (IBM SmartCloud® is a registered trademark of International Business Machines Corporation) Manager system 110 running sentiment analysis process 113 can determine a sentiment parameter-value dataset for content and can tag the content with metadata provided by the dataset. Manager system 110 running sentiment analysis process 113 can include, in some use cases, manager system 110 running a Natural Language Processing (NLP) process for determining one or more NLP output parameter of content that includes language element (e.g. text or audio based).

Manager system 110 can run examining process 114 to process video feed data from participant computer devices during the video conference. In a typical use case, video feed data of a video conference can include a head representation of a participant of a video conference as obtained by a camera of a participant computer device where the computer device is one of computer devices 130A-130Z. Manager system 110 running examining process 114 can include manager system 110 running of sentiment analysis process 113 for determining sentiment parameter-value datasets associated with the video feed representing facial features of a participant. Manager system 110 running examining process 114, in one embodiment can determine a sentiment output for each participant of a current video conference and can aggregate the sentiment outputs for each user to provide current group aggregate sentiment output for the video conference. A group aggregate sentiment output can be based on processing of a sample of available participant video feeds or can be based on processing of all available video feeds. The determining of current sentiment outputs and a current group aggregate sentiment can be iterative so that current sentiment outputs, for a participant or a group can be iteratively updated.

Manager system 110 can run trend analysis process 115 for determining a trend associated with a video conference participant. Manager system 110 running trend analysis process 115 can for example, determine using historical data that a certain participant's sentiment is subject to influence by other users of system 100. Manager system 110 can provide a video conference view to the certain participant based on determined trend information, e.g. to enhance desired influences on a participant's sentiment and/or to mitigate undesired influences on a participant's sentiment.

Referring to various areas of data repository 112, sentiment events area 2121 of data repository 112 can store data on a history of sentiment events experience by users of system 100 when participating in video conference. Sentiment events can be characterized, e.g. by a current sentiment of the user participant exceeding a high or low threshold. Registered trends area 2122 of data repository 112 can store data respecting recognized trends relating to users that have been recognized by manager system 110 running trend analysis process 115. When manager system 110 running trend analysis process 115 recognizes a trend, information of the trend can be stored in registered trends area 2122. Sentiment profile area 2123 can store data useful for determining sentiments of the user within or outside the context of video conferences. Sentiment profile area 2123 can include, e.g. timestamped and geostamped data for use in determining sentiments associated with user e.g. representing environments encountered by a user. Sentiment profile area 2123 can store sentiment profile data for each of several users of system 100, e.g. user 001, user 002, and so on. Video conference area 2124 of data repository 112 can store data on a history of video conferences in which have been supported by system 100. There can be stored in video conferences area 2124 statistical information on each supported video conference, e.g. summarizing the number of participants, identifiers for the participants history of video conference views presented during each video conference, the sentiment output of participants associated with different presented video conference views, the login and logout times, roles played by the various participants (e.g. either presenter or viewer or both) and so on.

Figure 2:
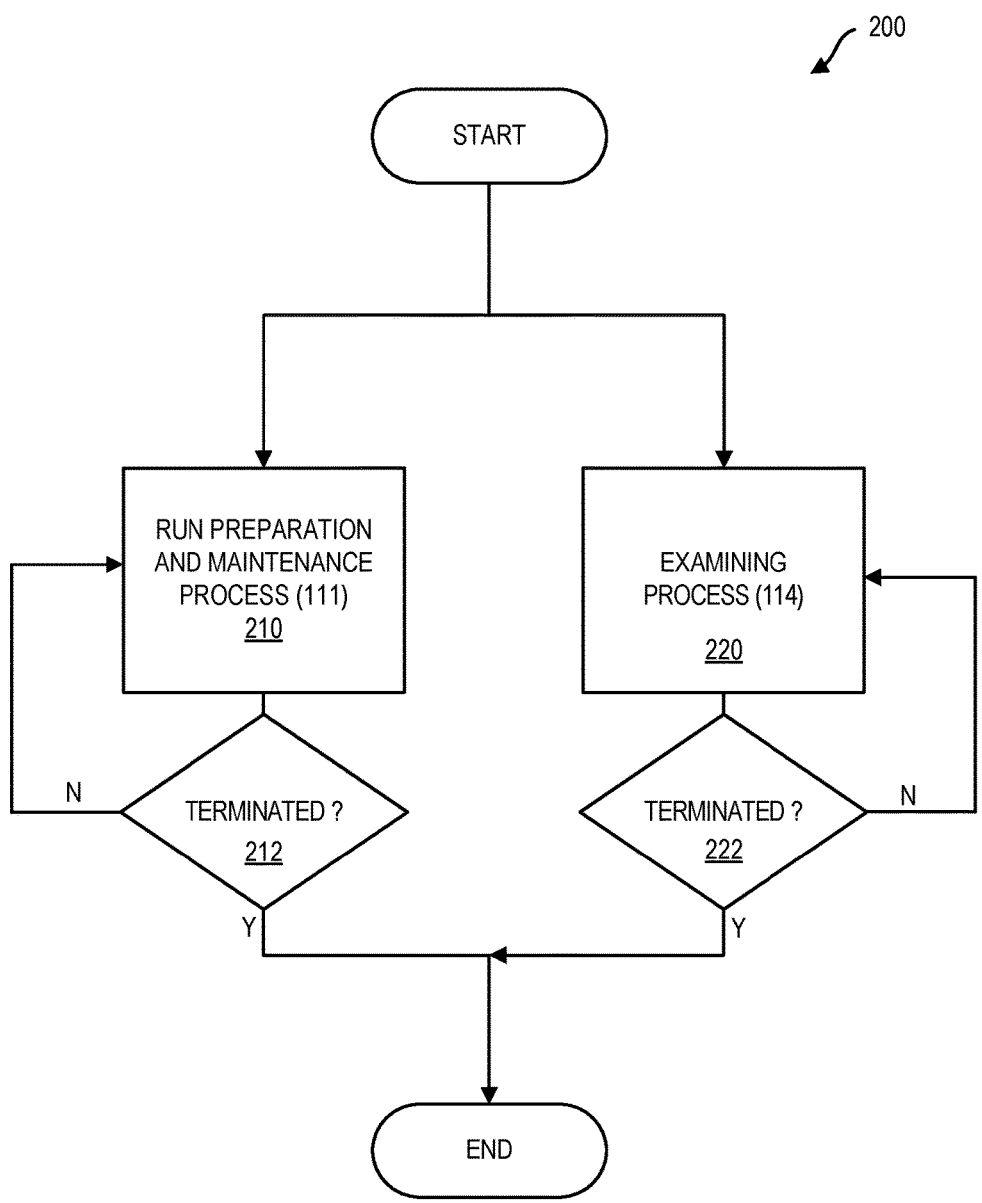
FIG. 2 is a flowchart illustrating a method that can be performed by a manager system according to one embodiment.

FIG. 2 is a flowchart illustrating a method 200 that can be performed by manager system 110. At block 210, manager system 110 can run preparation and maintenance process 111 e.g. to populate, prepare, and/or maintain various data of data repository 112 including data of sentiment events area 2121, registered trends area 2122, sentiment profile area 2123, and video conference area 2124. Manager system 110 can run preparation and maintenance process 111 until process 111 is terminated at block 212. At block 220, manager system 110 can run examining process 114. A plurality of instances of examining process 114 can be simultaneously run. Manager system 110 can run examining process 114 iteratively until examining process 114 is terminated at block 222.

For performance of preparation and maintenance process 111, manager system 110 can be configured to automatically process data inputs received from computer devices 130A-130Z. For performance of preparation and maintenance process 111, manager system 110 can be configured to receive data from computer devices 130A-130Z. Manager system 110 can run sentiment analysis process 113 for performing of preparation and maintenance process 111.

Figure 3:
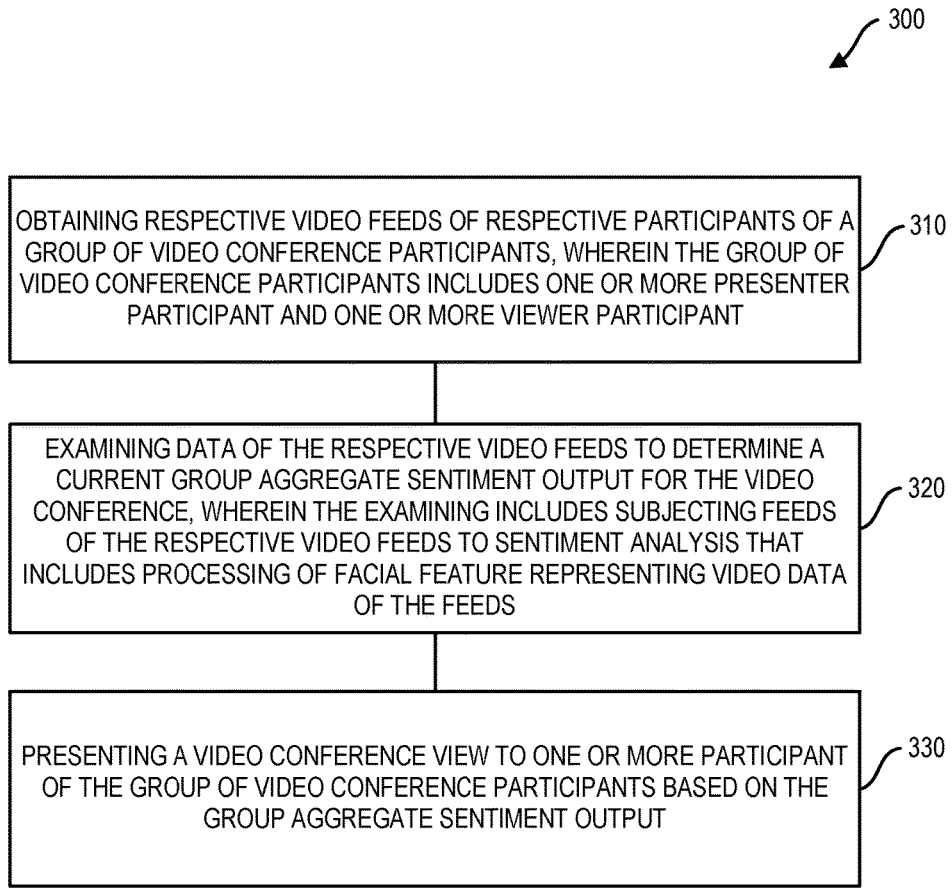
FIG. 3 is a flowchart depicting a method that can be performed by a manager system according to one embodiment.

In one embodiment, manager system 110 can perform method 300 as set forth in FIG. 3. At block 310, manager system 110 can perform obtaining respective video feeds of respective participants of a group of video conference participants, wherein the group of video conference participants includes one or more presenter participants and one or more viewer participant. Manager system 110 at block 320 can perform examining data of the respective video feeds to determine a current group aggregate sentiment output for the video conference wherein the examining includes subjecting feeds of the respective video feeds to sentiment analysis that includes processing of facial feature representing video data of the feeds. Manager system 110 at block 330 can perform presenting a video conference view to one or more participant of the group of video conference participants based on the group aggregate sentiment output.

Additional aspects of system 100 are described with reference to the flowchart of FIG. 4, which describes a particular embodiment for performance of method 300 performed by manager system 110 in the context of interoperation between manager system 110, computer devices 130A-130Z, and administrator computer device 125.

At block 1251, administrator computer device 125 based on one or more input provided by an administrator user can send configuration data to manager system 110 for receipt by manager system 110 at block 1101. Manager system 110 can configure manager system 110 based on the received configuration data received at block 1101. Configuration data sent at block 1251 and received at block 1101 can include configuration data for configuring the presentment of video conference views to a participant during a video conference.

Figure 5:
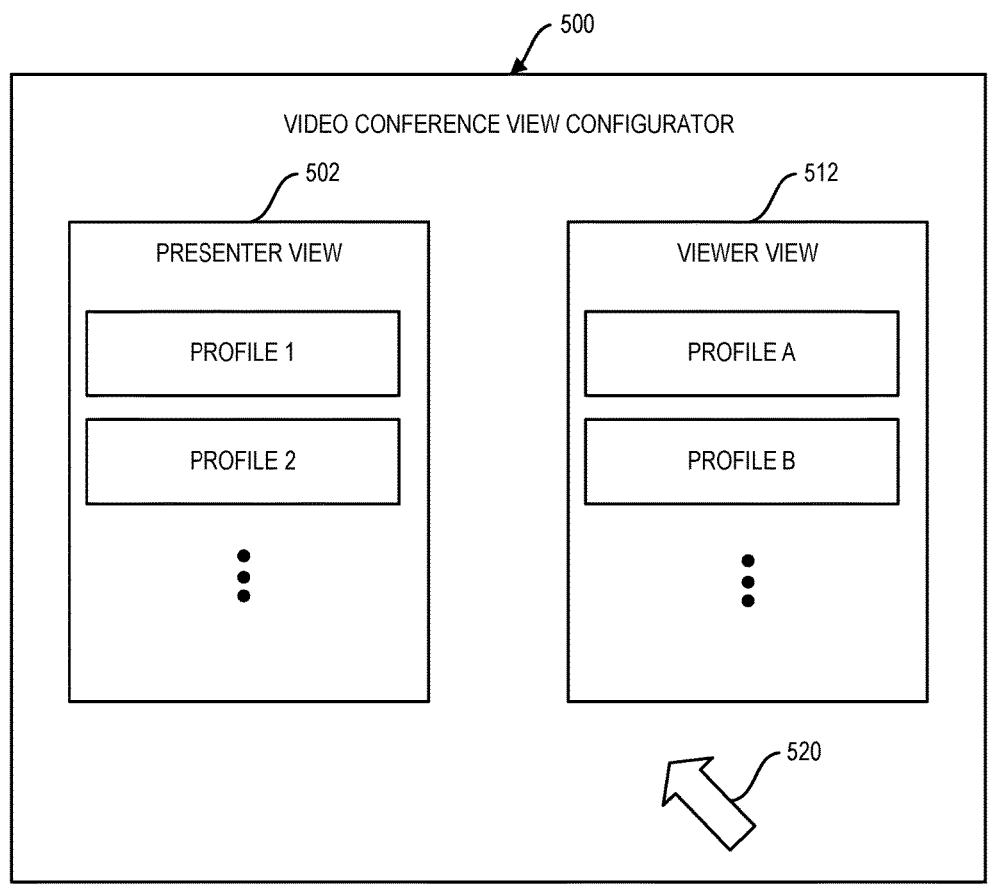
FIG. 5 is a user interface that can be displayed on a display of an administrator computer device.

FIG. 5 shows an administrator user interface 500 for display on a display on an administrator computer device 125. Administrator user interface 500 includes features that allow an administrator user to define aspects of video conference views for presentment to participants of a video conference such as presenter participants and viewer participants. Administrator user interface 500 can include, e.g. presenter view area 502 that allows the administrator user to define features of a presenter view of a video conference and features of a video conference presenter view for presentment to a presenter in a video conference and area 512 that allows an administrator user to define features of a video conference view for presentment of a viewer (i.e. not a presenter in a video conference). It will be understood that during a video conference, a particular participant can change roles, that is can change at any time during the video conference from a presenter role to a viewer role.

Figure 6B:
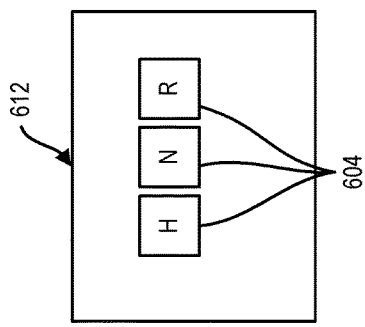
FIGS. 6A-6F are video conference views that can be presented to presenter participants and/or viewing participants of a video conference.

Administrator user interface 500 can include selector 520 that allows the administrator user to enter one or more input for defining configuration data. Exemplary video conference views are depicted in FIGS. 6A-6F. In FIG. 6A there is illustrated a baseline video conference view for 602 presentment on a display of a video conference participant's computer device, e.g. a computer device of computer devices 130A-130Z. In FIGS. 6A-6F video feed areas 604 are areas that present a video feed to a participant. In the examples of FIGS. 6A-6F the capital letters A-T inside the respective video feed areas 604 represents the particular participant that is represented by the feed presented in the feed area. Take for example, the use case where a current video conference includes 20 participants, participants A-T. Video conference view 602 as shown in FIG. 6A can include 20 video feed areas 604. Each video feed area 604 for presentment of a video feed corresponding to one particular participant A-T currently participating in the video conference. Thus, a participant viewing the video conference view 602 as depicted in FIG. 6A can simultaneously view video feed representations, e.g. live moving video head shot (and therefore facial feature) representations of each participant currently participating in the video conference. That is, each participant can simultaneously view a live video feed representing a headshot for each participant A-T.

Embodiments herein recognize that in some instances, performance of a video conference can be improved by establishing a video conference view to present the view other than the baseline video conference view 602 as shown in FIG. 6A. For example, as shown in FIG. 6B, video conference view 612 includes only three (3) video feed areas 604, one for each of the participants, H, N, and R, even though there are 20 participants, A-T, currently participating in the video conference. In other use cases, as set forth herein in reference to FIG. 6C and FIG. 6D, a video conference view can be configured to provide zero (0) video feed areas 604 as will be set forth herein.

Figure 4:
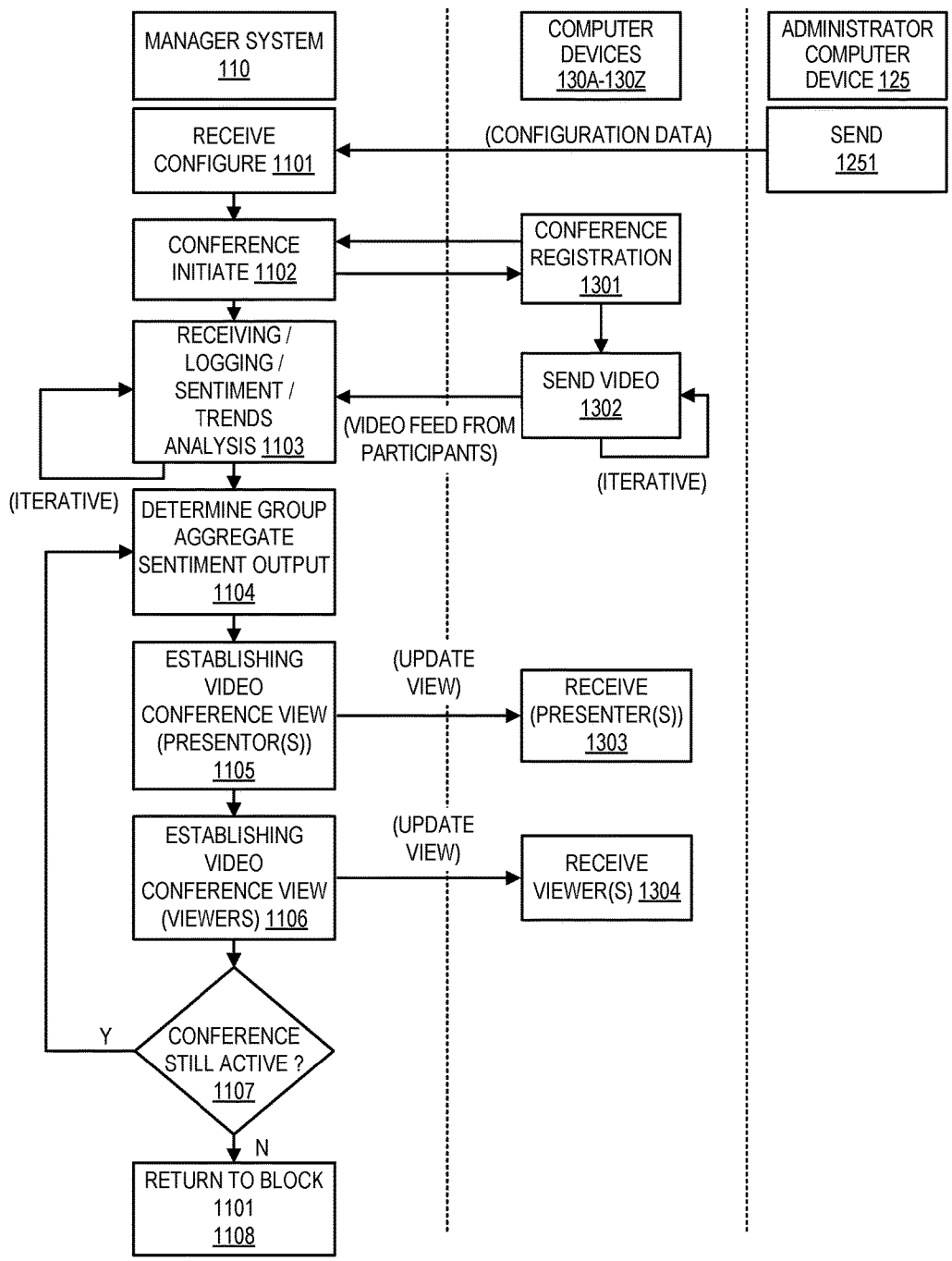
FIG. 4 is a flowchart depicting a method that can be performed by a manager system according to one embodiment in the context of its operations with computer devices and an administrator computer device.

Referring further to the flowchart of FIG. 4, manager system 110 at block 1102 can perform a conference initiation process in accordance with conference registration data received from computer devices of computer devices 130A-130Z at block 1301. While FIG. 4 depicts configuration data for configuring video conference views being received prior to initiation of a conference it will be understood that configuration data can be received during a video conference to update the configuration of a video conference view, based on administrator user defined configuration data received during a video conference.

Conference initiation at block 1102 and conference registration block 1301 can be compliant with the Realtime Transport Protocol (RTP) aspects of which are set forth in RFC 3550.

Referring further to the flowchart of FIG. 4, computer devices of computer devices 130A-130Z at block 1302 can send video feed data for receipt by manager system 110 at block 1103. At block 1103 manager system 110 can perform receiving, logging, sentiment analyzing and trends analyzing with respect to received video feed data received at block 1103. Each of the processes depicted at block 1302 performed by computer devices of computer devices 130A-130Z and manager system 110 at block 1103 can be performed iteratively throughout the period of time which the current video conference is active. Regarding send video data block 1302, the sent video data sent at block 1302 can be live moving video data representing a head shot of the video conference participant for each participant currently participating in a video conference. Each participant of a current video conference can include one computer device of computer devices 130A-130Z and the one computer device can have a camera disposed thereon for obtaining the live headshot video feed representing the participant associated to the computer device.

At block 1103 manager system 110 can be iteratively performing sentiment analysis of incoming video feed data representing facial features of each participant of a current video conference and can be logging all or some of such data into data repository 112. As will be described further herein, manager system 110 at block 1103 can be iteratively performing trends analysis using sentiment outputs pertaining to live video feeds of various participants.

Manager system 110 at block 1103 can iteratively determine a sentiment output for each current participant of a video conference based on the head shot video feed data of each current participant. The sentiment outputs for the respective participant can be generated, e.g. once per second, once per minute, or any arbitrary sampling period. Sentiment output for each participant of a live video conference can include one or more sentiment parameters. Sentiment parameters can include such parameters as a polar sentiment parameter, e.g. negative/positive polar sentiment or can include one or more non-polar parameter such as "anger", "disgust", "fear", "sadness", and "joy." Determined parameters can have associated values to provide for each sentiment parameter a parameter-value dataset.

According to a sentiment determination scheme facial feature recognition processes resulting in a smile being detected can result in high scoring values being associated to a polar negative/positive sentiment parameter and a or a high scoring value associated to a "joy" parameter. A value that is associated with a sentiment parameter can be regarded to be level confidence on a scale of zero to one. For example, the parameter-dataset of: <negative/positive>=0.9 can specify a 90% level of confidence that the analyzed content has a positive, e.g. as might be determine when a participant is smiling. In the case of a non-polar sentiment, parameter-dataset of: <joy>=0.85 can specify an 85% level of confidence that the sentiment associated with sample video data is joyful, also as might be determined in the case a participant is smiling.

At block 1104 manager system 110 can perform determining a current group aggregate sentiment output. The determining at block 1104 can be based on the sentiment data formatting performed at block 1103. That is where per participant sentiment outputs have a single parameter/value dataset format the group aggregate sentiment output provided at block 1104 can also have a single sentiment parameter/value dataset format. Where the sentiment output provided at block 1103 includes five non-polar sentiment value datasets the group aggregate sentiment output data format provided at block 1104 can also have five sentiment parameter/value dataset format. Manager system 110 determining a group aggregate sentiment output at block 1104 can include manager system 110 averaging the sentiment parameter/values for the various participants as determined at block 1103. Thus, on the performance at block 1104, manager system 110 provides data that specifies an overall sentiment of a group of participants currently participating in a video conference. In one embodiment, the group can include the entirety of current participants of a live video conference. In another embodiment, the group of participants can be a sample of participants of the current video conference. For example, using sample data rather than all available data can reduce latency and computational overhead.

Manager system 110 at block 1105 can perform establishing a video conference view for presentment to presenters of a current video conference. At block 1303, presenter participants of the current video conference can receive an updated video conference view based on the establishing at block 1105. The establishing at block 1105 by manager system 110 can be based on the configuration data defined by an administrator user received at block 1101. The establishing of video conference view at block 1105 for presentment to video conference presenters can be based on, in one embodiment, a determined group aggregate sentiment determined at block 1104.

Manager system 110 at block 1106 can perform establishing a video conference view for presentment to viewers of a current video conference. At block 1307, computer devices of viewer participants of a current video conference can receive an updated view of the video conference based on the establishing performed at block 1106. Establishing performed at block 1106 can be based on administrator user defined configuration data received at block 1101 as may be defined with use of one or more administrator input entered into administrator user interface 500 as set forth in FIG. 5. In some embodiments, the establishing at block 1106 can be based on a determined group aggregate sentiment output provided at block 1104. At block 1107, manager system 110 can determine that a current video conference continues to be active. Based on determining that current video conference continues to be active, manager system 110 at block 1106 can return to block 1104 to re-determine a current group aggregate sentiment output based on more recent per participant sentiment outputs determined at block 1103 and can proceed to iteratively perform the loop depicted in blocks 1105, 1106, 1107, and 1104 until the current live video conference is terminated.

It will be understood that during the period of time in which the video conference is active, participants can join or leave the video conference or switch roles, e.g. switch from being a presenter to a viewer or from being a viewer to a presenter. Manager system 110 through the time that video conference is active can examine participant live video feed data (which can be inclusive of audio data) to determine a current role for each participant. Various criterion can be utilized for determining whether to classify a participant as a presenter or a viewer. For example, manager system 110 in one embodiment can auto-classify a participant as a presenter on the basis of the presenter speaking with greater than a threshold frequency for greater than a threshold period of time.

Manager system 110 at block 1108 can return to block 1101 to receive updated configuration data defined by administrator user and can proceed to initiate a next video conference at block 1102. In one embodiment, manager system 110 can support a plurality of video conferences simultaneously.

Embodiments herein recognize that video conference views for presenters and viewers can be configured in a variety of different ways according to program goals. Referring to the administrator user interface 500 as depicted in FIG. 5, an administrator user can select a variety of different configurations for both a presenter view using presenter view area 502 and a viewer participant view using viewer view area 512. One useful participant video conference view is described with reference to the video conference views depicted in FIGS. 6A and 6B.

As described previously, FIG. 6A can represent a baseline view in which video feeds of each current participant of a current video conference are presented whereas FIG. 6B represents a video conference view wherein video feeds for only a subset of current video conference participants are presented and video feeds associated with the remaining participants are suppressed and not presented. Embodiments herein recognize that the providing of a simplified video conference view 612 as depicted in FIG. 6B can feature various advantages. For example, reduction of the information presented to a participant can improve the participant's focus on other information. Reduction of the information presented to participant in some use cases can be particularly advantageous where the participant is a presenter. Thus, the reduced information presentment can allow the presenter to allocate additional attention to a current presentation. Further, the reduced information content can be better aligned with a presenter's ability to comprehend given the presenter's current focus performing the current presentation. Embodiments herein recognize that the presentment of reduced information to a presenter can enhance the ability of the presenter to focus on the presentation being given.

In one embodiment, video conference view 612 as shown in FIG. 6B can be configured to present video feed data to a participant in a manner based on a determined group aggregate sentiment output as determined at block 1104. In one embodiment, manager system 110 can establish the selective video feed views of video feed areas 604 depicted in the video conference view 612 based on the selective video feed views of video feed areas 604 being representative of the overall determined current group aggregate sentiment output for a video conference.

For providing the video conference view depicted in FIG. 6B in one particular embodiment, manager system 110 can compare a current sentiment for each current participant to the current group aggregate sentiment output. In one embodiment, manager system 110 can output a dissimilarity score for each participant's current sentiment output relative to the current aggregate sentiment output. The dissimilarity score for each participant can specify a result of the comparing of the participant's current sentiment output to the determined current group aggregate sentiment output. Manager system 110 can rank participant based on the dissimilarity scores for the participants from lowest to highest so that the highest-ranking participant has a sentiment output that is the most similar (least dissimilar) among the participants to the current determined group aggregate sentiment output. In an embodiment described with reference to FIG. 6B manager system 110 can output the participants H, N, and R as being the participants with the rankings 1, 2 and 3 in the described ranking process, having rankings 1, 2, and 3. Thus, based on the participant's H, N, and R being determined to have sentiment outputs most representative of the determined current group aggregate sentiment output manager system 110 can selectively display video feeds of the selected participant's H, N, and R in video feed area 604 as depicted in FIG. 6B. As set forth herein, participants can benefit from the video conference view 612 depicted in FIG. 6B where video feeds of a select subset of participants are presented. The subset of video conference participants who are represented in video feed areas 604 can be selected on the basis of those participants having sentiment outputs that represent an overall group sentiment, e.g. as provided by the determined group aggregate sentiment output determined at block 1104.

Figure 6D:
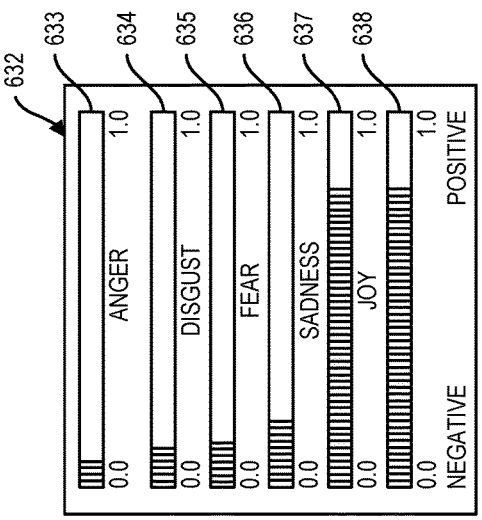
Figure 6A:
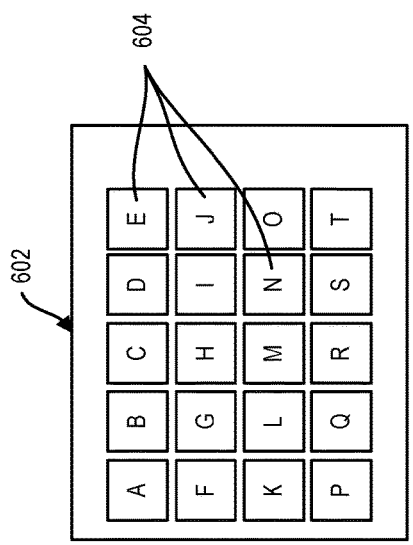
Figure 6C:
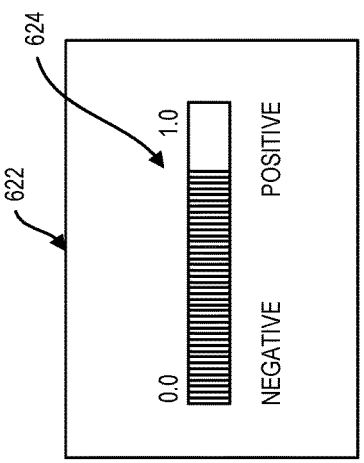

FIG. 6C illustrates another video conference view configuration which can be selected with use of administrator user interface 500 illustrated in FIG. 5. Video conference view 622 as depicted in FIG. 6C, graphically displays a barometer 624. Barometer 624 graphically presents an output based on the determined current group aggregate sentiment output determined at block 1104.

In the use case depicted in FIG. 6C, the determined current group aggregate sentiment output includes a single bipolar sentiment parameter. In the use case depicted in FIG. 6C all video feed areas 604 can be suppressed and not displayed. The video conference view depicted in FIG. 6C can be particularly useful for presentment to a presenter participant for reasons that have been set forth herein. Namely, that a presenter who is occupied providing a presentation, may have reduced capacity to comprehend information of video feeds of multiple users and thus the presentment of a simplified indicator in the form of graphic barometer 624 presents useful information to the presenter while allowing the presenter to maintain strong focus on the content of the presentation being given.

FIG. 6D illustrates an alternative video conference view 632 that is similar to video conference 622 shown in FIG. 6C. In the use case depicted in FIG. 6D all video feed areas 604 can be suppressed and not displayed. The video conference view 632 differs from video conference view 622 of FIG. 6C in that video conference view 632 presents barometers for more than a single sentiment parameter. The video conference view 632 graphically presents barometers 633-637 based on individual nonpolar sentiment parameter-value datasets for the nonpolar sentiment parameters "anger", "disgust", "fear", "sadness", and "joy" and barometer 638 is based on the polar sentiment parameter-value dataset for the sentiment parameter "negative/positive."

Embodiment herein recognize that viewer participants as well as presenter participants can benefit from the video conference view 612 as depicted in FIG. 6B presenting participant video feed views reduced relative to the baseline video conference view depicted in FIG. 6A. However, embodiments recognize that viewer participants may be capable of comprehending more information than a presenter participant based on the fact that a viewer participant is not occupied with providing the presentation. Accordingly, in one embodiment, system 100 can be configured so that a viewer participant is presented video conference view 642 as shown in FIG. 6E. Video conference view 642 of FIG. 6E is similar to video conference view 612 of FIG. 6B, except that video feeds corresponding to additional participants is presented. In addition to presenting video feeds of users H, N, and R as were presented in video conference view 612 of FIG. 6B, additional feeds for the participants T, J, and A are provided in video conference view 642 as shown in FIG. 6E. In video conference view 642, video conference feeds for participants H, N, and R, and T, J, and A are presented in respective video feed area 604. Where the participants H, N, and R are selected on the basis of having first, second, and third lowest dissimilarity scores relative to a current group aggregate sentiment output, the participants T, J, and A in one embodiment can be selected on the basis of having respective sentiment outputs that have the fourth, fifth, and sixth lowest dissimilarity scores with respect to the current group aggregate sentiment output determined at block 1104.

In one embodiment, manager system 110 can be configured so that while a presenter video conference participant is presented video conference view 612 of FIG. 6B one or more viewer participant of the video conference is presented video conference view 642 as depicted in FIG. 6E. Video conference view 612 of FIG. 6B and video conference view 642 of FIG. 6E can be simultaneously presented to respective presenter participant and viewer participant users of system 100. Thus, presenter participants and viewer participants can be presented with simultaneous views having similar information except that a presenter participant can be provided with information that is further reduced relative to the information presented to a viewer participant by inclusion of fewer participant specific video feeds. The configuration described recognizes that a presenter participant may have reduced capacity to comprehend video feed data relative to a participant who is not presenting.

In a further aspect system 100 can be configured so that different custom views are provided to different viewer participants of a video conference. That is, system 100 can be configured so that a first video conference view is presented to a first viewer participant and a second video conference view is presented to a second viewer participant. Embodiments herein recognize that it can be advantageous to present different viewer participants different video conference views e.g. to make use of different trend information determined for the different viewer participants. Embodiments herein recognize that sentiments exhibited by conference participants can be influenced by information displayed to the participants. In some instances, it may be advantageous to encourage participants to exhibit certain sentiments, e.g. positive sentiment for increased health and encouragement of teamwork and attention to a presentation, or in some cases negative sentiment.

Figure 7:
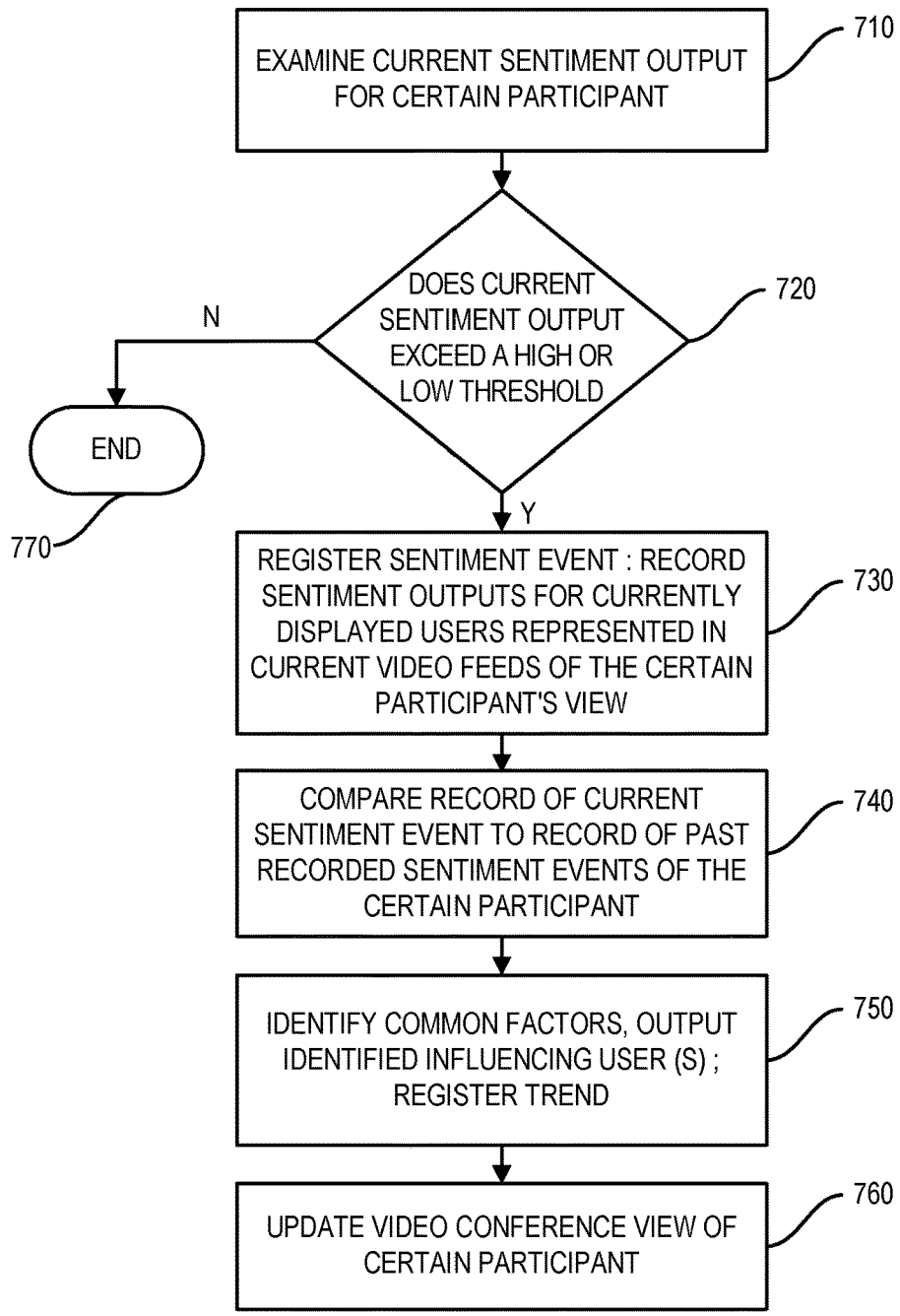
FIG. 7 is a flowchart illustrating a trends analysis process that can be performed by manager system according to one embodiment.

In one embodiment, a video presentation view presented to different certain viewer participants can be based on a trend analysis performed with respect to the different certain viewer participants. For example, manager system 110 can perform trend analysis to identify influencing users with respect to the certain participant. An influencing user as set forth herein can be regarded to be a user that influences a sentiment of the certain participant (positively or negatively) based on video data of the influencing user being presented to the certain participant. An exemplary trend analysis feature is described further with reference to the flowchart of FIG. 7.

In one embodiment, manager system 110 can run trend analysis process 115 at block 1103. Referring to the flowchart of FIG. 7, manager system 110 at block 710 can perform examining a current sentiment output for a certain participant. At block 720, manager system 110 can determine whether the current sentiment output for the certain participant exceeds a high or low threshold. Based on the current sentiment output not exceeding a high or low threshold, processing can end at block 770. Based on a determining that a current sentiment output for a certain participant exceeds a high or low threshold, manager system 110 can proceed to block 713 to register a sentiment event.

In a simplified use case, where the sentiment parameter is a single polar positive/negative parameter, a sentiment event can be characterized by an exhibited sentiment for the certain participant being either extremely positive, i.e. above a threshold or extremely negative, i.e. below a threshold. On the registration of a sentiment event at block 730, manager system 110 can record in data repository 112 in sentiment events area 212 a sentiment event record for the currently determined sentiment event.

Thus, suppose a certain participant is currently being presented the video conference view 642 as depicted in FIG. 6E and a sentiment event is determined for the certain participant. In such a scenario, manager system 110 at block 730 can record in sentiment events area 2122 of data repository 112 a sentiment event record. In one embodiment such a sentiment event record can include current sentiment outputs for each of the participants H, N, R, T, J, and A having associated video feeds being presented to the certain participant as shown by video conference view 642. Thus, the recorded sentiment event record provides a record of potential influences on the certain participant at the time the certain participant exhibited sentiment sufficient to trigger a sentiment event.

At block 740, manager system 110 can compare the sentiment event record recorded for the current sentiment event recorded at block 730 to sentiment event records for previously recorded sentiment events for the certain participant. The prior sentiment events may be sentiment events of the current video conference or a prior video conference. During a past sentiment event of the certain participant, the video conference view presented to the certain participant may have included video feeds of participants other than those depicted in the current video conference view. The displayed participants for past sentiment events for example, can include participants of system 100 other than the participants H, N, R, T, J, and A depicted in the video conference view 642 of FIG. 6E and other than participants A-T currently participating in the current video conference. Manager system 110 at block 750 can identify by processing of the sentiment event records of the certain participant common factors (e.g. views of common participants presented) between sentiment events of the certain participant. At block 750 manager system 110 can output identified influencing participants identified as a result of the comparing at block 640.

In one embodiment, manager system 110 at block 750 can identify participant J as a positively influencing user of the certain participant of video conference view 642 based on the determination that the certain participant exhibited a positive sentiment more than a threshold percentage of time where participant J is represented in a video conference view presented to the certain participant (for such check video conference area 2124 of data repository 112 can provide a record of instances where a representation of participant J is presented to the certain participant without a positive sentiment being exhibited). Manager system 110 at block 750 can identify participant R as a negatively influencing user of the certain participant of video conference view 642 based on the determination that the certain participant exhibited a negative sentiment more than a threshold percentage of times where participant R is represented in a video conference view presented to the certain participant (for such check video conference area 2124 of data repository 112 can provide a record of instances where a representation of participant R is presented to the certain participant without a negative sentiment of the certain participant being exhibited).

At block 750 manager system 110 can register the determined trend information determined at block 750 in registered trends area 2122 of data repository 112. Registered trends area 2122 can include such information as identifiers for identified positive influencing users of the certain participant and identifiers for negative influencing users of the certain participant. Manager system 110 at block 760 can perform updating a video conference view of a certain participant based on determined trend information determined at block 750, e.g. including the identification of positive influencing users of the certain participant and negative influencing users of the certain participants. The updated view can be presented to a user during a next pass of block 1105 or block 1106 as describe in connection with the flowchart of FIG. 4. In the described example, the updated video conference view presented to the certain user can prioritize the presenting of video feed views of users identified as positive influencing users and can deprioritize video feed area depicting users identified as negatively influencing users who negatively influence the certain participant.

Figure 6F:
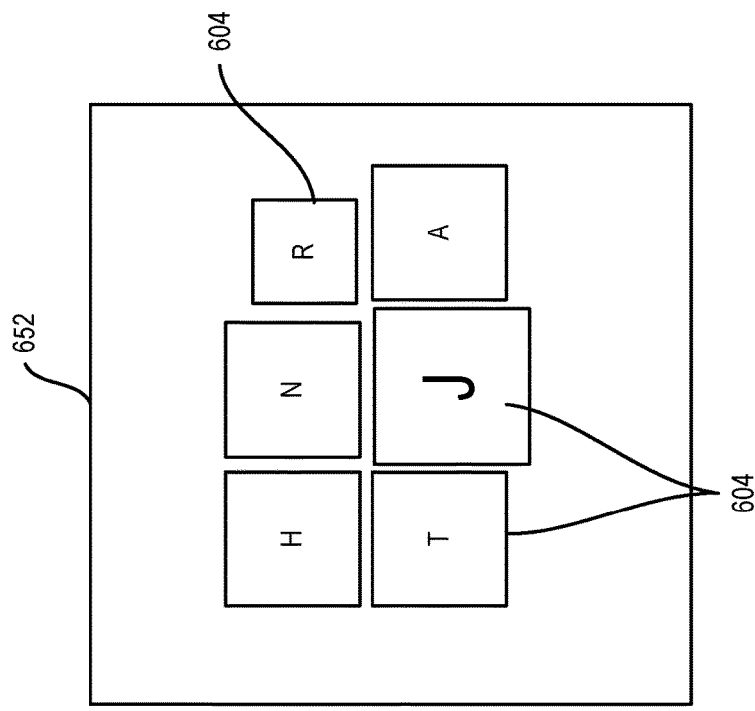
Figure 6E:
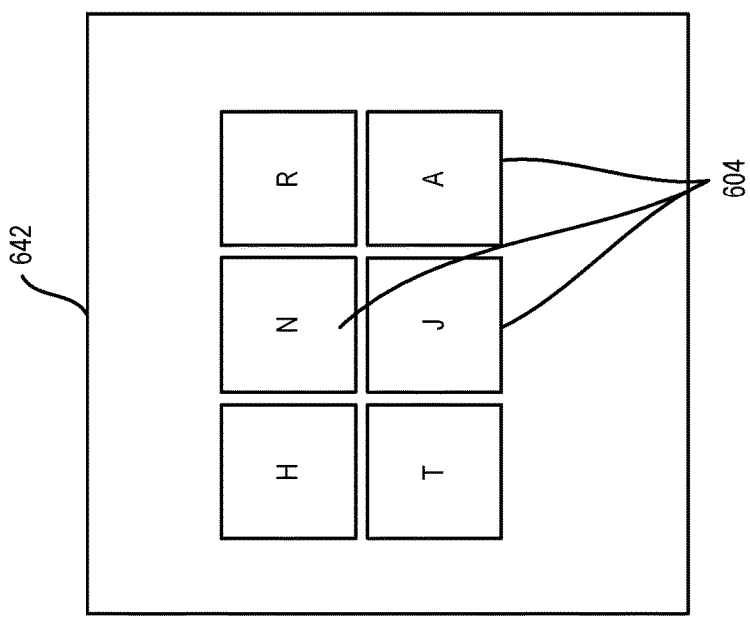

Referring to FIG. 6F, there is depicted a video conference view 652 wherein the video feed area 604 depicting the identified positively influencing user J positively influencing the certain participant is presented in an enlarged video feed area 604 whereas the video feed area 604 depicting the identified negatively influencing user R negatively influencing the certain user is deprioritized by being depicted in a relatively smaller video feed area 604. As is illustrated by comparison to video conference view 642 and video conference view 652 prioritization and deprioritization can be accomplished by making video feed areas larger or smaller, i.e. larger for prioritizing and smaller for deprioritizing. However, it will be noted that alternative prioritization and deprioritization schemes can be implemented. For example, prioritized video feed areas can be presented, e.g. in more centered locations, in different color, with different boundaries, earlier in a presented sort order and the like. Different deprioritization schemes can be chosen as well. In one example of deprioritization a deprioritized video feed area can be deprioritized by being suppressed altogether and not presented to the certain participant.

With further reference to registered trends area 2122 of data repository 112, manager system 110 at block 1105 and/or block 1106 can be configured so that at block 1105 or 1106 manager system 110 examines user identifiers specified in trends area 2122 for identifiers of users identified as influencing users in reference to currently logged on participant of a current video conference. In one embodiment, manager system 110 can automatically prioritize presentment of video feeds representing identified positive influencing users and automatically deemphasize video feeds representing an identified negatively influencing user based on a determination that the identified user identified in registered trends area 2122 has joined the current video conference since the time of the most recent iteration of block 1105 or block 1106. During an initial pass through block 1105 or 1105 (i.e. at the start of a video conference) manager system 110 by examination of user identifiers specifying influencing user in trends area 2122, can automatically prioritize presentment of video feeds representing identified positive influencing users and automatically prioritize presentment of video feeds representing an identified negatively influencing user based on a determination that the identified user identified in registered trends area 2122 is a participant of the current video conference. It will be seen herein through the lifetime of system 100, system 100 can "learn" new trends and accordingly can improve performance via machine learning. Manager system 110 can be configured to periodically audit registered trends records of registered trends area 2122 specifying influencing user statuses using recently updated participant information of video conferences area 2124. Accordingly, by machine learning process manager system 110 can register records of new trends and delete records of prior recorded trends where criterion resulting the trend classification is no longer applicable.

Referring again to administrator user interface 500 as depicted in FIG. 5, an administrator user can configure system 100 to present a selected video conference views of the depicted video conference views 602, 612, 622, 632, 642, 652 (FIGS. 6A-6F) based on selection of an appropriate profile that has been associated to the depicted video conference view.

System 100 can be configured so that the video conference view 602 having functionality described with reference to FIG. 6A is presented to presenter participants based on a selection by an administrator user of a select one profile option (profile 1, profile 2) of presenter view area 502 of administrator user interface 500. System 100 can be configured so that the video conference view 612 having functionality described with reference to FIG. 6B is presented to presenter participants based on a selection by an administrator user of a select one profile option (profile 1, profile 2 . . . ) of presenter view area 502 of administrator user interface 500. System 100 can be configured so that the video conference view 622 having functionality described with reference to FIG. 6C is presented to presenter participants based on a selection by an administrator user of a select one profile option (profile 1, profile 2 . . . ) of presenter view area 502 of administrator user interface 500. System 100 can be configured so that the video conference view 632 having functionality described with reference to FIG. 6D is presented to presenter participants based on a selection by an administrator user of a select one profile option (profile 1, profile 2 . . . ) of presenter view area 502 of administrator user interface 500. System 100 can be configured so that the video conference view 642 having functionality described with reference to FIG. 6E is presented to presenter participants based on a selection by an administrator user of a select one profile option (profile 1, profile 2 . . . ) of presenter view area 502 of administrator user interface 500. System 100 can be configured so that the video conference view 642 having functionality described with reference to FIG. 6F is presented to presenter participants based on a selection by an administrator user of a select one profile option (profile 1, profile 2 . . . ) of presenter view area 502 of administrator user interface 500.

System 100 can be configured so that the video conference view 602 having functionality described with reference to FIG. 6A is presented to viewer participants based on a selection by an administrator user of a select one profile option (profile A, profile B . . . ) of viewer view area 504 of administrator user interface 500. System 100 can be configured so that the video conference view 612 having functionality described with reference to FIG. 6B is presented to viewer participants based on a selection by an administrator user of a select one profile option (profile A, profile B . . . ) of viewer view area 504 of administrator user interface 500. System 100 can be configured so that the video conference view 622 having functionality described with reference to FIG. 6C is presented to presenter participants based on a selection by an administrator user of a select one profile option (profile 1, profile 2 . . . ) of presenter view area 502 of administrator user interface 500. System 100 can be configured so that the video conference view 632 having functionality described with reference to FIG. 6D is presented to presenter participants based on a selection by an administrator user of a select one profile option (profile 1, profile 2 . . . ) of presenter view area 502 of administrator user interface 500. System 100 can be configured so that the video conference view 642 having functionality described with reference to FIG. 6E is presented to presenter participants based on a selection by an administrator user of a select one profile option (profile 1, profile 2 . . . ) of presenter view area 502 of administrator user interface 500. System 100 can be configured so that the video conference view 642 having functionality described with reference to FIG. 6F is presented to presenter participants based on a selection by an administrator user of a select one profile option (profile 1, profile 2 . . . ) of presenter view area 502 of administrator user interface 500.

As set forth herein, the determination of a current group aggregate sentiment output can be iteratively provided. Thus, video conference views 602, 612, 622, 632, 642, 652 can be iteratively updated. Therefore, a presenter or other participant can be given real time feedback as to the overall group sentiment associated with a current video presentation. In the case a video conference view 602, 612, 622, 632, 642, 652 is provided to a presenter the presenter is given real time feedback as to the presenter's performance based on a processing video data representing facial features and therefore expressions of various video conference participants.

Certain embodiments herein may offer various technical computing advantages, involving computing advantages to address problems arising in the realm of computer networks. A fundamental aspect of a computer system's functionality is its ability to interact with users. If users are given irrelevant or inaccurate information, users are likely to disengage from a computer system. If one the other hand a computer system provides accurate and relevant information the attention of a user can be retained as wells as continued interactions between computer system users. Embodiments herein can improve networked communications between users in one aspect with use of features that use artificial intelligence (AI) to provide relevant information to conference participants. With accurate information provided a likelihood of respective users of networked computer systems remaining engaged and in communication with one another through the performance of a task and over the course of the performance of several tasks increases. Embodiments herein can include advanced user interface features for enhancing engagement of a user to a computer system, e.g. can include real time feedback information to a video conference presenter as to the sentiment exhibited by participants viewing the presentation, thus allowing the presenter to alter performance based on the feedback. Embodiments herein therefore can provide a real-time training mechanism to facilitate training with respect to a participant's ability to interact with a computer network. Embodiments herein can provide participants (viewing or presenting) information as to an overall group sentiment exhibited by a group of participants updated in real time as a video conference progresses. Embodiments herein can employ data structuring processes, e.g. sentiment analysis which can be used to tag processed content with determined sentiment parameters and parameter values. Embodiments herein can for example feature crowdsourced rules so that determinations provided by a computer system accurately account for varying perspectives of a plurality of users. Embodiments herein can provide results and advantages that are not possible or practical without use of components of a technical computing environment, such as providing for decision making using fact items that human users cannot practically of possibly access. Embodiments herein can include artificial intelligence processing platforms featuring improved processes to transform unstructured data into structured form permitting computer based analytics and predictive decision making. Embodiments herein also can include machine learning platforms that leverage historical data for improved predictive analytics.

Figure 8:
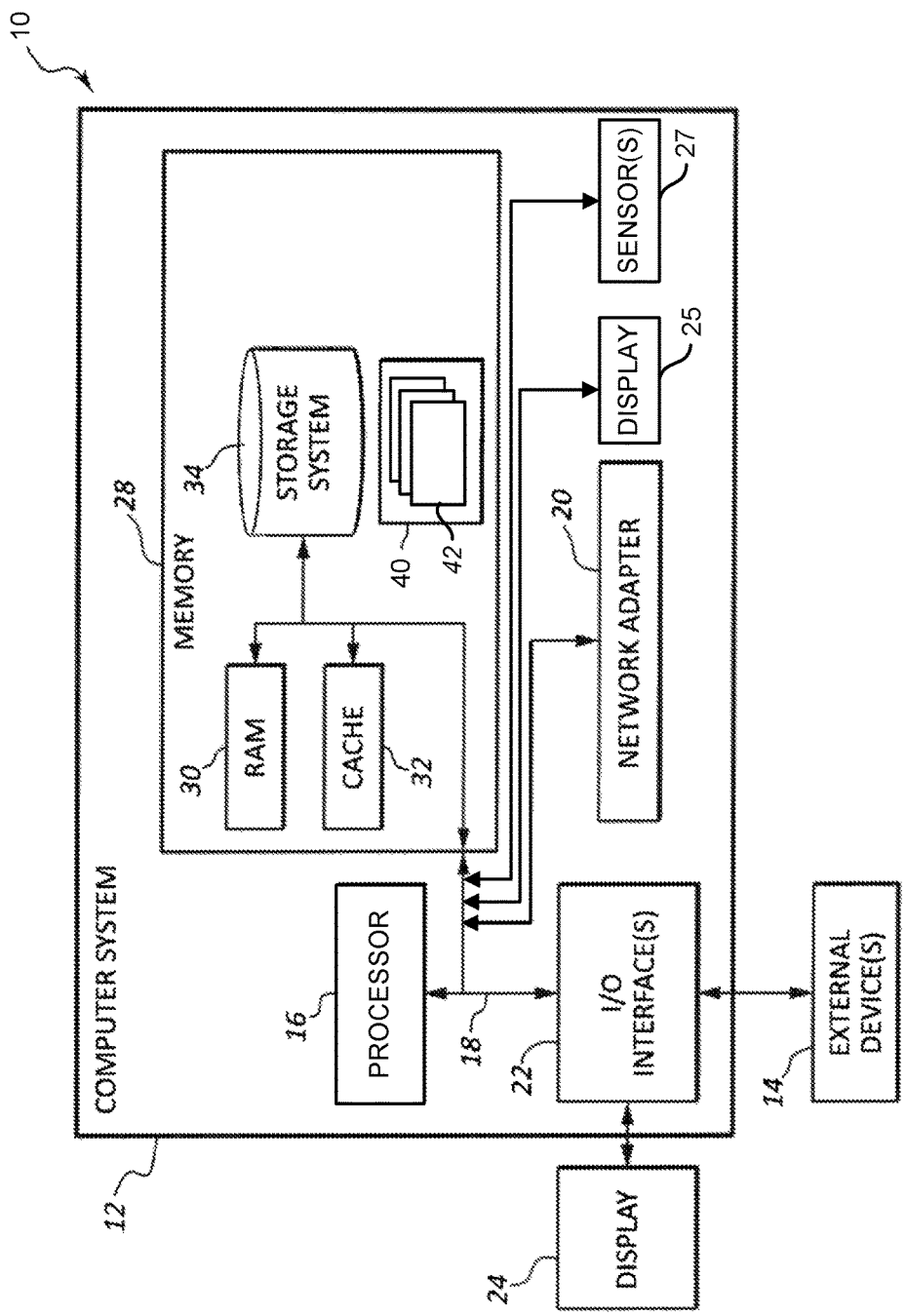
FIG. 8 depicts a computing node according to one embodiment.
Figure 9:
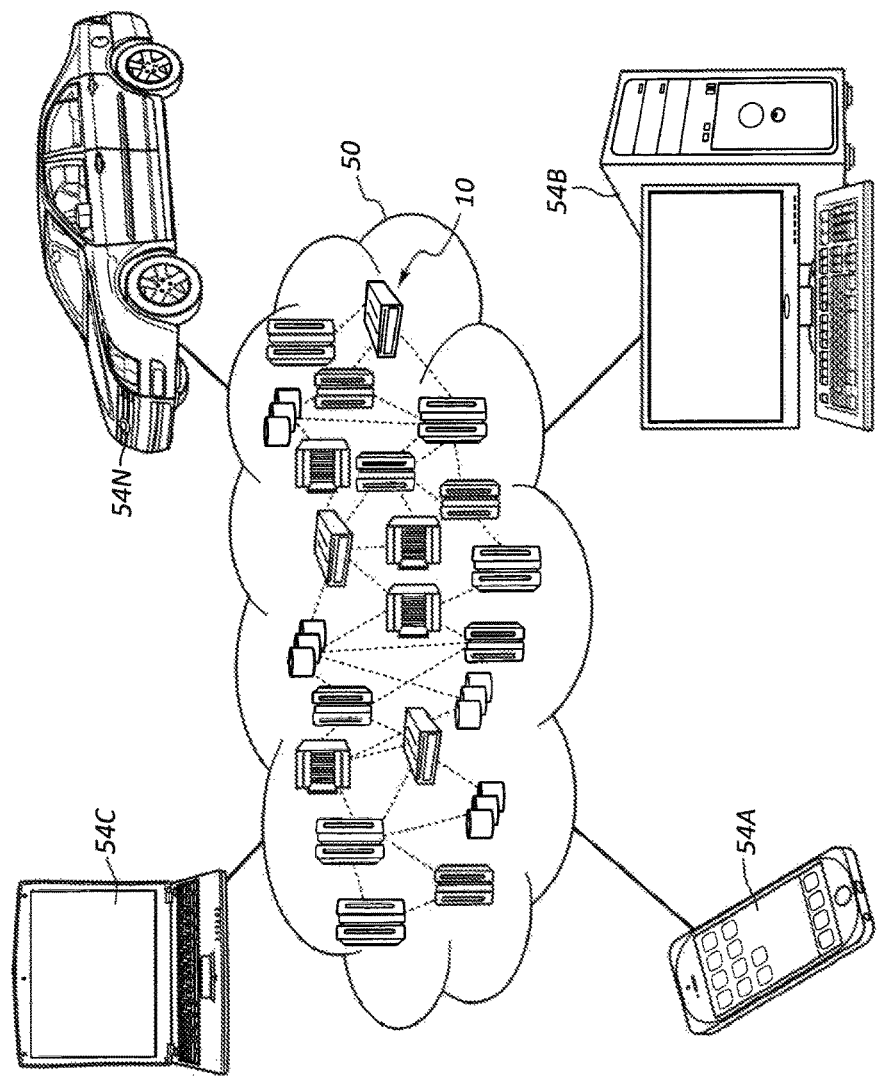
FIG. 9 depicts a cloud computing environment according to one embodiment.
Figure 10:
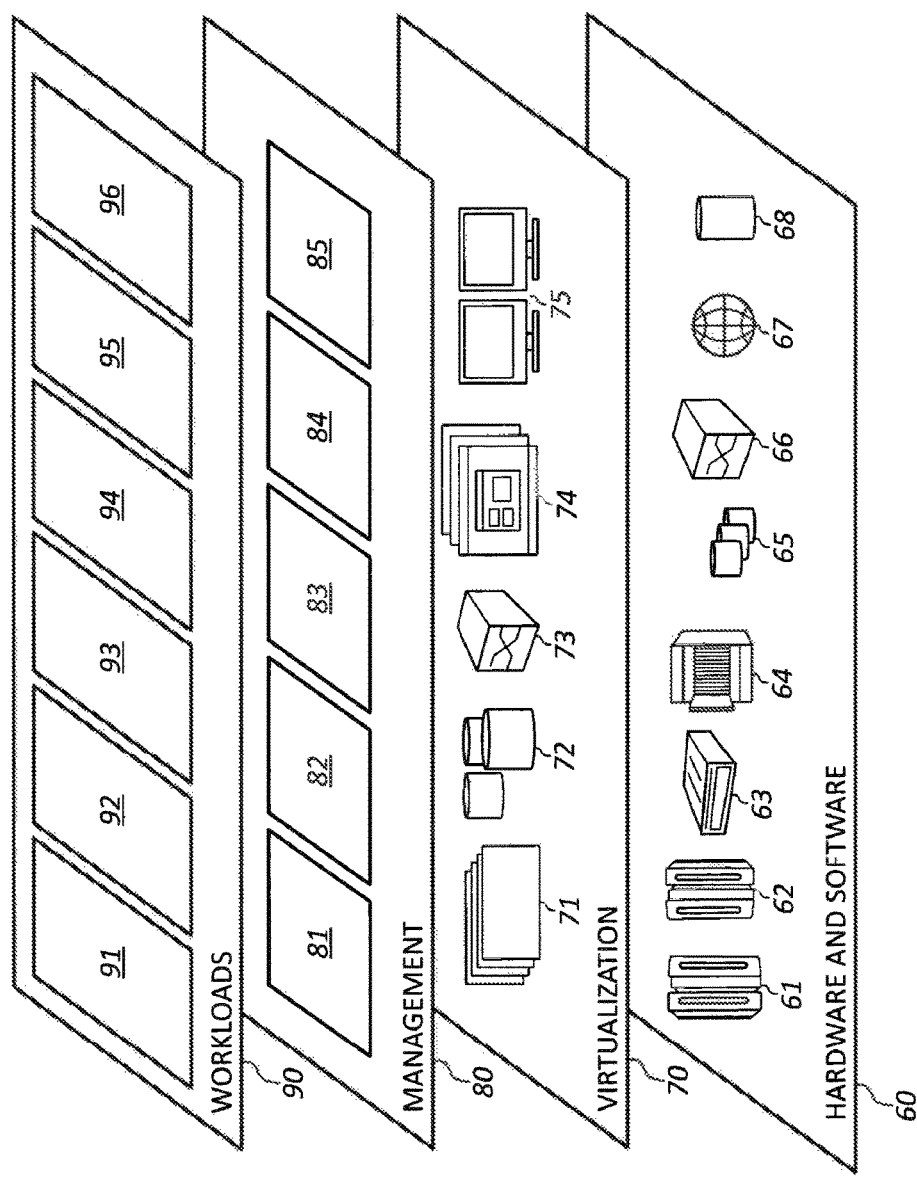
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, for performing functions described with reference to method 300 of FIG. 3, and the functions described with reference to manager system 110 as set forth in the flowchart of FIG. 4. In one embodiment, the computing node based devices of FIG. 1 can include one or more computing node 10 and can include one or more program 40 for performing functions described in respect to the various computing node based devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a heartrate sensor, a blood pressure (bp) sensor or an audio sensor. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for examining video feed data and for performing related processes as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining respective video feeds of respective participants of a group of video conference participants, wherein the group of video conference participants includes one or more presenter participant and one or more viewer participant;
examining data of the respective video feeds to determine a current group aggregate sentiment output for a video conference, wherein the examining includes subjecting data of feeds of the respective video feeds to sentiment analysis that includes processing of facial feature representing video data of the feeds; and
presenting a video conference view to one or more participant of the group of video conference participants based on the group aggregate sentiment output, wherein the presenting a video conference view to one or more participant of the group of video conference participants includes presenting a first video conference view to a presenter of the video conference and presenting a second video conference view to a viewer of the video conference, wherein the first video conference view presents N video feeds representing certain one or more viewers of the video conference, the N video feeds being selected on the basis of the certain one or more viewers currently exhibiting sentiments representative of the current group aggregate sentiment output for the video conference, wherein the second video conference view presents M video feeds representing certain two or more viewers of the video conference, the M video feeds being selected on the basis of the two or more viewers currently exhibiting sentiments representative of the current group aggregate sentiment output for the video conference, wherein N is less than M and wherein certain one or more viewers and the certain two or more viewer have zero to N viewers in common.

2. The method of claim 1, wherein the presenting a video conference view to one or more participant of the group of video conference participants includes presenting a video conference view to a presenter of the video conference, wherein the video conference view presents certain one or more video feeds representing certain one or more viewers of the video conference, the certain one or more video feeds being selected on the basis of the certain one or more viewers currently exhibiting sentiments representative of the current group aggregate sentiment output for the video conference.

3. The method of claim 1, wherein the presenting a video conference view to one or more participant of the group of video conference participants includes presenting a video conference view to a presenter of the video conference, wherein the video conference view graphically displays a barometer representative of a current group aggregate sentiment output for the video conference.

4. The method of claim 1, wherein the examining data of the respective video feeds to determine a current group aggregate sentiment output for the video conference includes iteratively performing the examining data of the respective video feeds to determine a current group aggregate sentiment output for the video conference and iteratively subjecting feeds of respective video feeds representing participant facial features to sentiment analysis, and wherein the presenting a video conference view to one or more participant of the group of video conference participants based on the group aggregate sentiment output includes iteratively updating the video conference view to the one or more participant of the group of video conference participants based on the group aggregate sentiment output.

5. The method of claim 1, wherein the presenting a video conference view to one or more participant of the group of video conference participants includes presenting a video conference view to a certain participant based on a result of trend processing to determine a trend of the certain participant, the trend processing including examining historical video conference data of the certain participant.

6. The method of claim 1, wherein the presenting a video conference view to one or more participant of the group of video conference participants includes presenting a video conference view to a certain participant based on a result of trend processing to determine a trend of the certain participant, the trend processing including examining historical video conference data of the certain participant, wherein the video conference is a current video conference in which the group of video conference participants are currently participating, wherein the historical data includes data selected from the group consisting of the current video conference and a prior video conference.

7. The method of claim 1, wherein the presenting a video conference view to one or more participant of the group of video conference participants includes presenting a video conference view to a certain participant based on a result of trend processing to determine a trend of the certain participant, the trend processing including examining historical video conference data of the certain participant, wherein the result of the trend processing includes identification of a particular participant that positively influences a sentiment of the certain participant by video feed display of video data representing particular participant, and wherein the presenting the video conference view to the certain participant includes prioritizing a video feed view having video data that represents the particular participant.

8. The method of claim 1, wherein the presenting a video conference view to one or more participant of the group of video conference participants includes presenting a video conference view to a certain participant based on a result of trend processing to determine a trend of the certain participant, the trend processing including examining historical video conference data of the certain participant, wherein the result of the trend processing includes identification of a particular participant that negatively influences a sentiment of the certain participant by video feed display of video data representing particular participant, and wherein the presenting the video conference view to the certain participant includes de-prioritizing a video feed view having video data that represents the particular participant.

9. A computer program product comprising:
   a computer readable storage medium readable by one or more processing circuit and storing instructions for execution by one or more processor for performing a method comprising:
      obtaining respective video feeds of respective participants of a group of video conference participants, wherein the group of video conference participants includes one or more presenter participant and one or more viewer participant;
      examining data of the respective video feeds to determine a current group aggregate sentiment output for a video conference, wherein the examining includes subjecting data of feeds of the respective video feeds to sentiment analysis that includes processing of facial feature representing video data of the feeds; and
      presenting a video conference view to one or more participant of the group of video conference participants based on the group aggregate sentiment output, wherein the presenting a video conference view to one or more participant of the group of video conference participants includes presenting a video conference view to a certain participant based on a result of trend processing to determine a trend of the certain participant, the trend processing including examining historical video conference data of the certain participant, wherein the result of the trend processing includes identification of a particular participant that positively influences a sentiment of the certain participant by video feed display of video data representing particular participant, and wherein the presenting the video conference view to the certain participant includes prioritizing a video feed view having video data that represents the particular participant.

10. The computer program product of claim 9, wherein the presenting a video conference view to one or more participant of the group of video conference participants includes presenting a video conference view to a presenter of the video conference, wherein the video conference view presents certain one or more video feeds representing certain one or more viewers of the video conference, the certain one or more video feeds being selected on the basis of the certain one or more viewers currently exhibiting sentiments representative of the current group aggregate sentiment output for the video conference.

11. The computer program product of claim 9, wherein the presenting a video conference view to one or more participant of the group of video conference participants includes presenting a first video conference view to a presenter of the video conference and presenting a second video conference view to a viewer of the video conference, wherein the first video conference view presents N video feeds representing certain one or more viewers of the video conference, the N video feeds being selected on the basis of the certain one or more viewers currently exhibiting sentiments representative of the current group aggregate sentiment output for the video conference, wherein the second video conference view presents M video feeds representing certain two or more viewers of the video conference, the M video feeds being selected on the basis of the two or more viewers currently exhibiting sentiments representative of the current group aggregate sentiment output for the video conference, wherein N is less than M and wherein certain one or more viewers and the certain two or more viewer have zero to N viewers in common.

12. The computer program product of claim 9, wherein the presenting a video conference view to one or more participant of the group of video conference participants includes presenting a video conference view to a presenter of the video conference, wherein the video conference view graphically displays a barometer representative of a current group aggregate sentiment output for the video conference.

13. The computer program product of claim 9, wherein the examining data of the respective video feeds to determine a current group aggregate sentiment output for the video conference includes iteratively performing the examining data of the respective video feeds to determine a current group aggregate sentiment output for the video conference and iteratively subjecting feeds of respective video feeds representing participant facial features to sentiment analysis, and wherein the presenting a video conference view to one or more participant of the group of video conference participants based on the group aggregate sentiment output includes iteratively updating the video conference view to the one or more participant of the group of video conference participants based on the group aggregate sentiment output.

14. A system comprising:
    a memory;
    at least one processor in communication with memory; and
    program instructions executable by one or more processor via the memory to perform a method comprising:
       obtaining respective video feeds of respective participants of a group of video conference participants, wherein the group of video conference participants includes one or more presenter participant and one or more viewer participant;
       examining data of the respective video feeds to determine a current group aggregate sentiment output for a video conference, wherein the examining includes subjecting data of feeds of the respective video feeds to sentiment analysis that includes processing of facial feature representing video data of the feeds; and
       presenting a video conference view to one or more participant of the group of video conference participants based on the group aggregate sentiment output, wherein the presenting a video conference view to one or more participant of the group of video conference participants includes presenting a video conference view to a certain participant based on a result of trend processing to determine a trend of the certain participant, the trend processing including examining historical video conference data of the certain participant, wherein the result of the trend processing includes identification of a particular participant that negatively influences a sentiment of the certain participant by video feed display of video data representing particular participant, and wherein the presenting the video conference view to the certain participant includes de-prioritizing a video feed view having video data that represents the particular participant.

15. The system of claim 14, wherein the examining data of the respective video feeds to determine a current group aggregate sentiment output for the video conference includes iteratively performing the examining data of the respective video feeds to determine a current group aggregate sentiment output for the video conference and iteratively subjecting feeds of respective video feeds representing participant facial features to sentiment analysis, and wherein the presenting a video conference view to one or more participant of the group of video conference participants based on the group aggregate sentiment output includes iteratively updating the video conference view to the one or more participant of the group of video conference participants based on the group aggregate sentiment output.

16. The system of claim 14, wherein the presenting a video conference view to one or more participant of the group of video conference participants includes presenting a video conference view to a certain participant based on a result of trend processing to determine a trend of the certain participant, the trend processing including examining historical video conference data of the certain participant.

17. The system of claim 14, wherein the presenting a video conference view to one or more participant of the group of video conference participants includes presenting a video conference view to a certain participant based on a result of trend processing to determine a trend of the certain participant, the trend processing including examining historical video conference data of the certain participant, wherein the video conference is a current video conference in which the group of video conference participants are currently participating, wherein the historical data includes data selected from the group consisting of the current video conference and a prior video conference.

18. The system of claim 14, wherein the presenting a video conference view to one or more participant of the group of video conference participants includes presenting a video conference view to a certain participant based on a result of trend processing to determine a trend of the certain participant, the trend processing including examining historical video conference data of the certain participant, wherein the result of the trend processing includes identification of a particular participant that positively influences a sentiment of the certain participant by video feed display of video data representing particular participant, and wherein the presenting the video conference view to the certain participant includes prioritizing a video feed view having video data that represents the particular participant.

19. The system of claim 14, wherein the presenting a video conference view to one or more participant of the group of video conference participants includes presenting a video conference view to a certain participant based on a result of trend processing to determine a trend of the certain participant, the trend processing including examining historical video conference data of the certain participant, wherein the result of the trend processing includes identification of a particular participant that negatively influences a sentiment of the certain participant by video feed display of video data representing particular participant, and wherein the presenting the video conference view to the certain participant includes de-prioritizing a video feed view having video data that represents the particular participant.

20. The system of claim 14, wherein the presenting a video conference view to one or more participant of the group of video conference participants includes presenting a first video conference view to a presenter of the video conference and presenting a second video conference view to a viewer of the video conference, wherein the first video conference view presents N video feeds representing certain one or more viewers of the video conference, the N video feeds being selected on the basis of the certain one or more viewers currently exhibiting sentiments representative of the current group aggregate sentiment output for the video conference, wherein the second video conference view presents M video feeds representing certain two or more viewers of the video conference, the M video feeds being selected on the basis of the two or more viewers currently exhibiting sentiments representative of the current group aggregate sentiment output for the video conference, wherein N is less than M and wherein certain one or more viewers and the certain two or more viewer have zero to N viewers in common.

* * * * *